United States Patent [19]
Gerken et al.

[11] Patent Number: 4,782,625
[45] Date of Patent: Nov. 8, 1988

[54] METHOD OF CONTAMINATED SOIL REMEDIATION AND APPARATUS THEREFOR

[75] Inventors: Steven L. Gerken; Brian M. Bell; John P. Isley, all of Valparaiso, Ind.

[73] Assignee: Canonie Environmental Services, Inc., Porter, Ind.

[21] Appl. No.: 34,295

[22] Filed: Apr. 3, 1987

[51] Int. Cl.$^4$ ............................................. A01B 77/00
[52] U.S. Cl. .......................................... 47/1.42; 47/58; 47/DIG. 10
[58] Field of Search ................... 47/58, 1.42, DIG. 10; 171/18

[56] References Cited

U.S. PATENT DOCUMENTS

| | | | |
|---|---|---|---|
| 1,444,794 | 2/1923 | Kernan | 47/1.42 X |
| 2,602,388 | 7/1952 | Elliott et al. | 47/1.42 |
| 2,775,174 | 12/1956 | Petrick | 47/1.42 X |
| 4,420,901 | 12/1983 | Clarke | 47/1.42 X |

FOREIGN PATENT DOCUMENTS 608185  9/1960  Italy ..................................... 47/1.42

*Primary Examiner*—Robert E. Bagwill
*Attorney, Agent, or Firm*—Flynn, Thiel, Boutell & Tanis

[57] ABSTRACT

A method and apparatus for on-site remedial soil restoration activity of a work site contaminated with volatile organic compounds. Soil is removed from the ground and hauled to an initial feed hopper whereat it is conveyed to an inlet end of a hollow rotating cylinder having plural flights therein for effecting a moving of the contaminated soil lengthwise of the rotating cylinder toward an outlet end. The soil is heated as it tumbles about in the cylinder and the volatile orgainc compounds (VOCs) are volatilized inside the rotating cylinder. The hot gases drawn from the cylinder are filtered for the purpose of removing dry soil fines. The soil exiting the outlet end of the cylinder is then recirculated through the rotating cylinder and thereafter fed to a conveying mechanism, whereat the cleaned soil is delivered to a selected location. The cleaned soil is then placed into the ground. The hot gases are scrubbed to remove therefrom any organics, acids and phosgenes. The gases are thereafter fed to a bed of activated carbon for the purpose of extracting the remaining volatile organic compounds (VOCs) therefrom and allowing the now clean air to escape into the atmosphere.

18 Claims, 5 Drawing Sheets

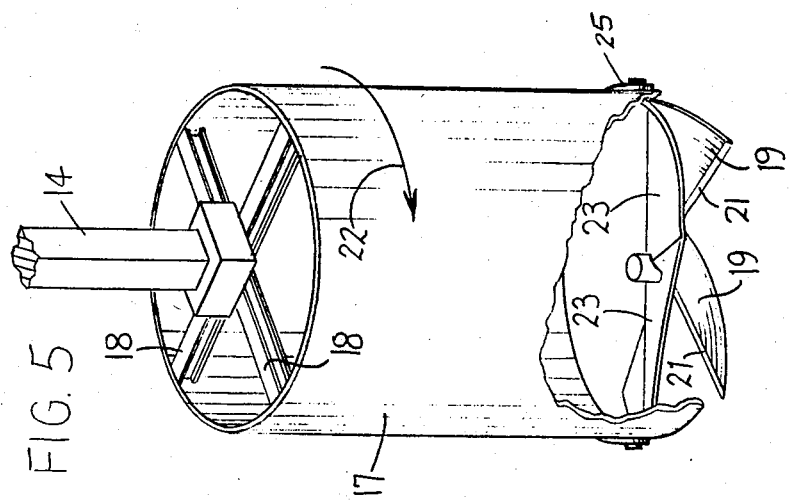
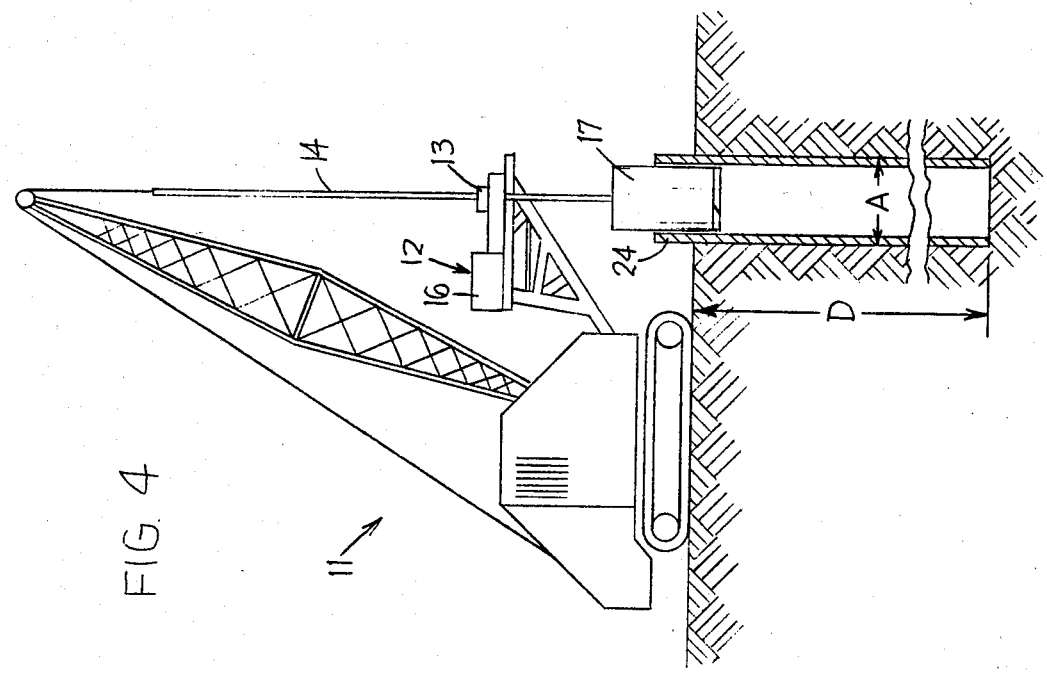

METHOD OF CONTAMINATED SOIL REMEDIATION AND APPARATUS THEREFOR

FIELD OF THE INVENTION

This invention relates to a method and apparatus for facilitating an on-site remedial soil restoration activity of a work site contaminated with volatile organic compounds (VOCs), including halogenated hydrocarbons, petroleum hydrocarbons and derivatives of petroleum hydrocarbons, including halogenated petroleum hydrocarbons, and petroleum hydrocarbons substituted with, for example, alkyl, hydroxy, nitro, nitroso and other substituent groups disposed at the site at an earlier time, which volatile organic compounds (VOCs) have soaked into the soil.

BACKGROUND OF THE INVENTION

Remedial soil restoration activity on a given work site is generally problematic due to the hazardous chemicals released into the air during a handling of the soil. Generally, work sites with such chemicals in the soil, such as tank farms, gasoline stations, manufacturing sites and other land uses, are close to populated areas and, as a result, any volatilization of the chemicals into the air may be problematic from a health standpoint. Further, as the soil is handled, dust containing the chemicals will generally be developed and disperse into the local neighborhoods and create further problems.

Another problem associated with remedial soil restoration activity is that contaminated soil is generally removed from the site and hauled to a "safer" site for proper disposal. Objection is usually raised by local communities surrounding the new site thus introducing further problems with which to contend. It is feared by the local communities in and around the new site that their area will at some future date become contaminated by the contaminated soils introduced into their local landfill site.

Further, local communities near the existing work site are reluctant to allow, or opposed to, the long-term storage of untreated soils and/or wastes at the work site in "secure" impoundments due to a fear that the impoundments may eventually leak and again expose the soils and/or wastes to the environment. Finally, it is the intent of the Congress of the United States, as stated in the Superfund Amendments and Reauthorization Act of 1986 (PL 99-499), the U.S. Environmental Protection Agency, and many other regulatory agencies and citizens that the most appropriate response in the restoration of a work site is to treat the soil and/or waste on-site to reduce or eliminate the volume, toxicity, or mobility of chemicals in the soil and/or wastes and thereby effect a permanent remediation of the site.

Accordingly, it is the object of the present invention to provide both a method and an apparatus for on-site remedial soil restoration activity which allows a work site, contaminated with volatile organic compounds (VOCs) proposed or released at the site at an earlier time and permitted to soak into the soil, to be restored through the removal of the VOCs consistent with standards promulgated by appropriate regulatory agencies.

It is further the object of the invention to provide an on-site remedial soil restoration activity which is capable of maintaining ambient air quality at the site and of complying with relevant air quality standards as promulgated by appropriate regulatory agencies.

It is a further object of the invention to provide an on-site remedial soil restoration activity which is capable of entrapping all of the volatile organic compounds (VOCs) that might likely become airborne during a treatment of the soil as well as entrapping soil particles that may likely adversely impact ambient air quality.

It is a further object of the invention to provide an on-site remedial soil restoration activity utilizing trailerized equipment capable of being disassembled and trucked to other locations for remedial soil restoration activity.

It is a further object of the invention to provide an on-site remedial soil activity, for work sites containing large volumes of soil to be treated over the course of long periods of time, utilizing equipment which is generally constructed on permanent foundations, but may be disassembled and trucked to other locations for remedial soil restoration activity.

It is a further object of the invention to provide an on-site remedial soil restoration activity wherein the soils, which contain the volatile organic compounds (VOCs), are treated on-site and rendered harmless and thereafter collected, permitting a return of the treated soil back to the place from which it was excauated, or alternatively, to another location.

It is a further object of the invention to provide an on-site remedial soil restoration activity, as aforesaid, wherein the volatile organic compounds (VOCs) are collected in a form allowing a removal of the volatile organic compounds (VOCs) from the site for incineration or other purposes, thereby eliminating the problem associated with a placement of the organic compounds into another landfill site or the use of other less desirable disposal alternatives.

SUMMARY OF THE INVENTION

In general, the objects and purposes of the invention are met by providing a method and apparatus for on-site remedial soil restoration activity of a work site contaminated with volatile organic compounds (VOCs), including halogenated hydrocarbons, petroleum hydrocarbons and derivatives of petroleum hydrocarbons, including halogenated petroleum hydrocarbons, and petroleum hydrocarbons substituted with, for example, alkyl, hydroxy, nitro, nitroso and other substituent groups disposed at the site at an earlier time, which substances have been permitted to soak into the ground. The method and apparatus facilitate a removing of the soil from the ground and transmitting it to an initial feed hopper whereat it is conveyed to an inlet end of a hollow rotating cylinder having plural flights therein for effecting a moving of the contaminated soil lengthwise through the rotating cylinder toward an outlet end in response to a rotating of the cylinder. In addition, the method and apparatus facilitates a heating of the contaminated soil as it tumbles about in the rotating cylinder and as the soil moves from the inlet end toward the outlet end, the volatile organic compounds (VOCs) being volatilized inside the rotating cylinder. The interior of the rotating cylinder is evacuated by drawing hot gases out therefrom with the direction of air flow running counter to the movement of soil, which hot gases contain the volatile organic compounds (VOCs). The gases are filtered for the purpose of removing soil fines. The soil exiting the outlet end of the rotating cylinder is thence recirculated through the rotating cylinder and thereafter fed into a conveying mechanism, whereat the now cleaned soil is delivered to the location from where the contaminated soil is removed from the ground or to an alternative location. The hot gases are scrubbed clean by using air and a liquid to remove therefrom any organics, acids and phosgenes that might be present therein in a liquified form. The gases are thereafter fed with the organics, acids and phosgenes removed therefrom to a bed of activated carbon for the purpose of extracting the remaining volatile organic compounds (VOCs) therefrom and allowing the now clean air to exhaust into the atmosphere.

BRIEF DESCRIPTION OF THE DRAWINGS

Further objects and purposes of this invention will be apparent to persons acquainted with methodology and apparatus of this general type upon reading the following specification and inspecting the accompanying drawings, in which:

FIG. 4 is a side elevational view of a caisson rig; and

FIG. 5 is a front perspective view of a digging bucket which may be employed during the removal of the contaminated soil from the ground.

DETAILED DESCRIPTION

Figure 1A:
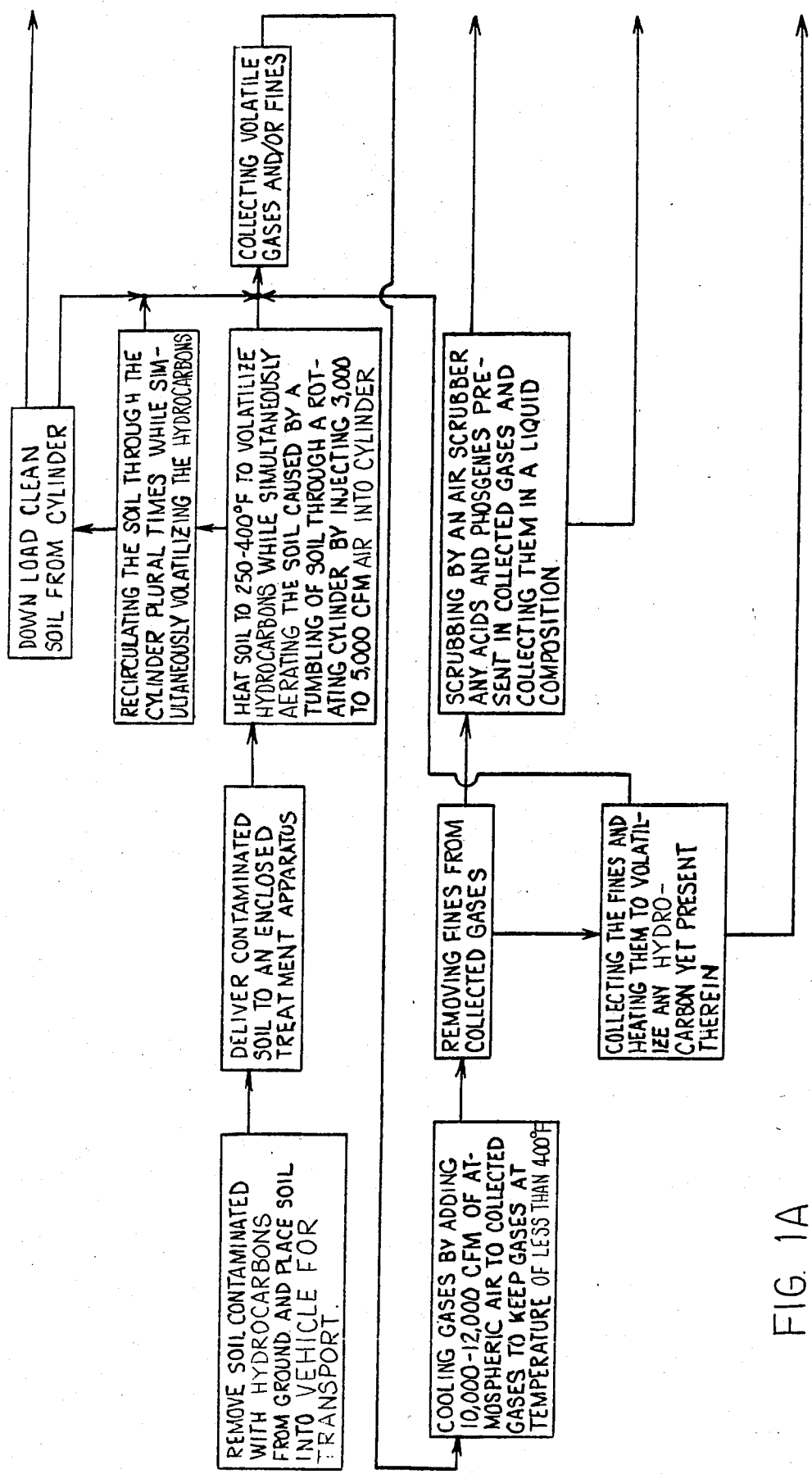
FIGS. 1A and 1B are a flow chart of the inventive methodology employed in the invention.

Certain terminology may be used in the following description for convenience in reference only and will not be limiting. The words "up", "down", "right" and "left" will designate directions in the drawings to which reference is made. The words "forward" and "rearward" will refer to the directions of material flow through the device, "forwardly" being the normal flow direction. The words "in" and "out" will refer to directions toward and away from, respectively, the geometric center of the device and designated parts thereof. Such terminology will include the words above specifically mentioned, derivates thereof and words of similar import.

Figure 2:
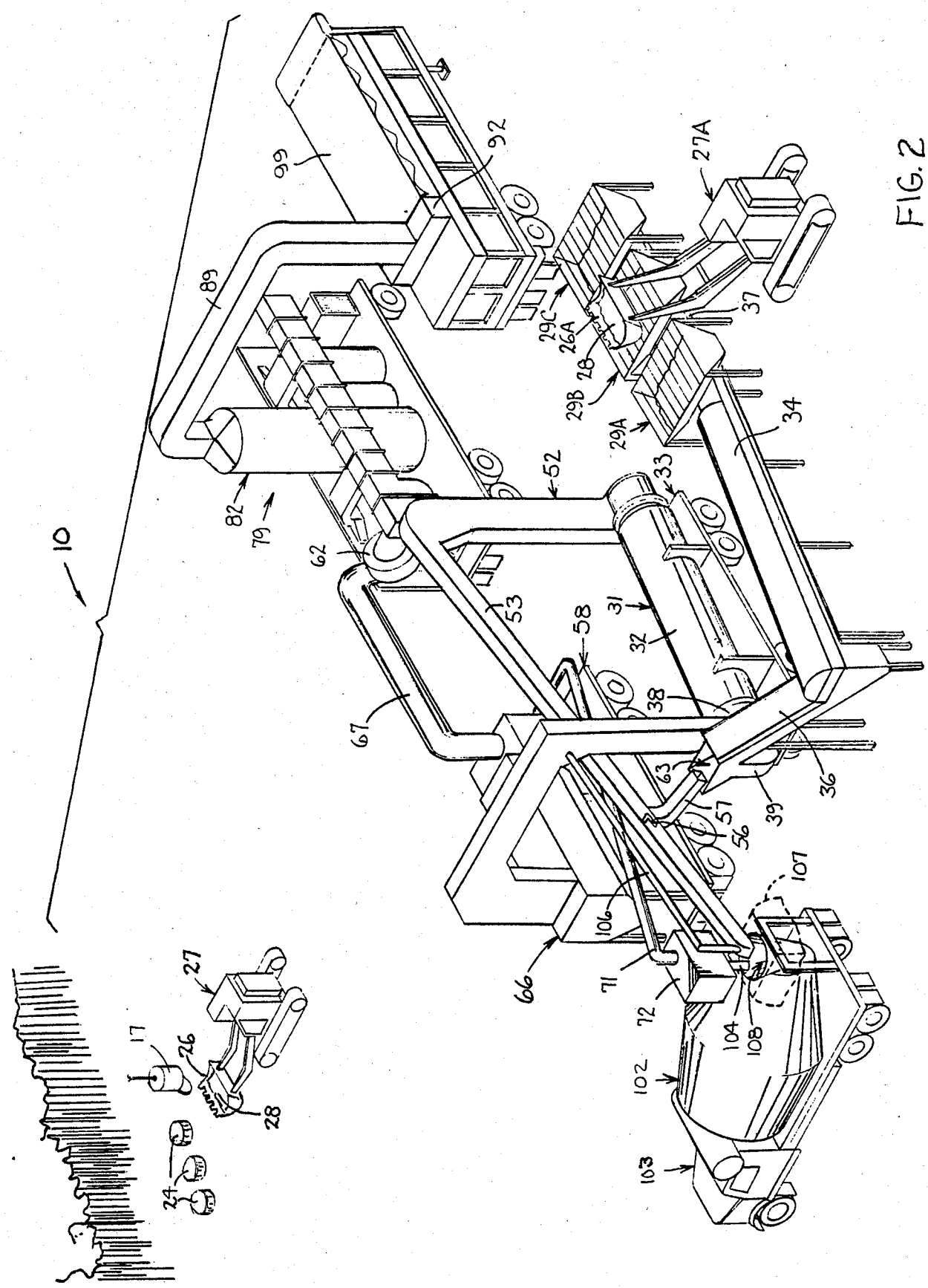
FIG. 2 is a perspective view of the inventive apparatus.

The apparatus employed in effecting an on-site remedial soil restoration activity is generally indicated by the reference numeral 10 in FIG. 2. The apparatus 10 includes a caisson rig 11 (FIG. 4) having a drilling attachment 12 affixed thereto. The drilling attachment has a hollow sleevelike member 13 adapted to receive therein a generally square kelly bar 14 therethrough. The sleeve 13 on the drilling attachment 12 has a square opening therethrough and in which is received the kelly bar 14. The drilling attachment 12 has a motor 16 thereon capable of driving the sleeve 13 for rotation and, thence, the kelly bar 14 for rotation.

As shown in FIG. 5, the kelly bar 14 is fixed to a digging bucket 17 which is generally a hollow cylindrical member having at the upper end thereof cross bracing 18. The lower end of the kelly bar 14 is secured by any conventional structure to the cross bracing 18 as shown. Plural digging flights 19 are provided at the bottom of the digging bucket 17. The digging flights 19 have a sharp edge 21 facilitating a digging of the flights into the earth as the digging bucket is rotated in the direction of the arrow 22. As soil is moved up by the digging flights 19 into the interior of the digging bucket 17, rubber check flaps 23 are provided so as to facilitate the passing of the soil into the interior of the digging bucket 17 but prevent soil from exiting the digging bucket 17 as it is lifted from the ground.

More specifically, the digging flights 19 and the heavy rubber check flaps 23 are mounted on a ring 25 which is attached to the digging bucket 17 by a hinge and a latch arrangement (not shown). When the soils have been brought to the surface and are ready to be unloaded, the crane operator releases the latch allowing the bucket bottom to hinge open, and the soils to discharge out of the digging bucket 17. The operator then re-latches the hinged bottom to the digging bucket 17 and the excavation cycle is repeated as necessary. The aforementioned digging bucket is of a conventional design and, as a result, further discussion of the specific structure of the digging bucket is believed unnecessary.

A casing 24 (FIGS. 2 and 4) is first placed into the ground to a specified depth D. The depth to which the casing will be placed is determined by preliminary testing of the soil to determine the depth at which the contaminated soil lies. A conventional casing length is generally about 20 feet. Each casing has an outer diameter A. The internal diameter of the interior of the casing is slightly greater than the external diameter of the digging bucket 17. Adjacent casings are also placed into the ground and in a common row and are spaced from one another a distance A, centerline to centerline of each casing. As a result of this spacing, the casings can be emptied of the soil contained therein by lowering the digging bucket 17 into a selected one of the casings as shown in FIG. 4 and rotated to cause soil to enter the interior of the digging bucket 17. The caisson rig 11, following a filling of the digging bucket 17, raises the digging bucket 17 from the ground and swings it to a bucket 26 on a front end loader 27. A tarp or the like (not illustrated) is placed over the bucket 26 during transit of the front end loader to the location of a front end loader 27A illustrated in FIG. 2 whereat the bucket 26A filled with contaminated soil 28 is dumped into one of several hoppers 29A, 29B or 29C. The provision of multiple hoppers 29A, 29B and 29C facilitate a continued operation of the front end loader during periods of time that contaminated soil is being removed from a respective one of the hoppers. That is, appropriate gating is utilized on each hopper to allow only the contaminated soil of one hopper to be removed therefrom at a time.

Figure 3:
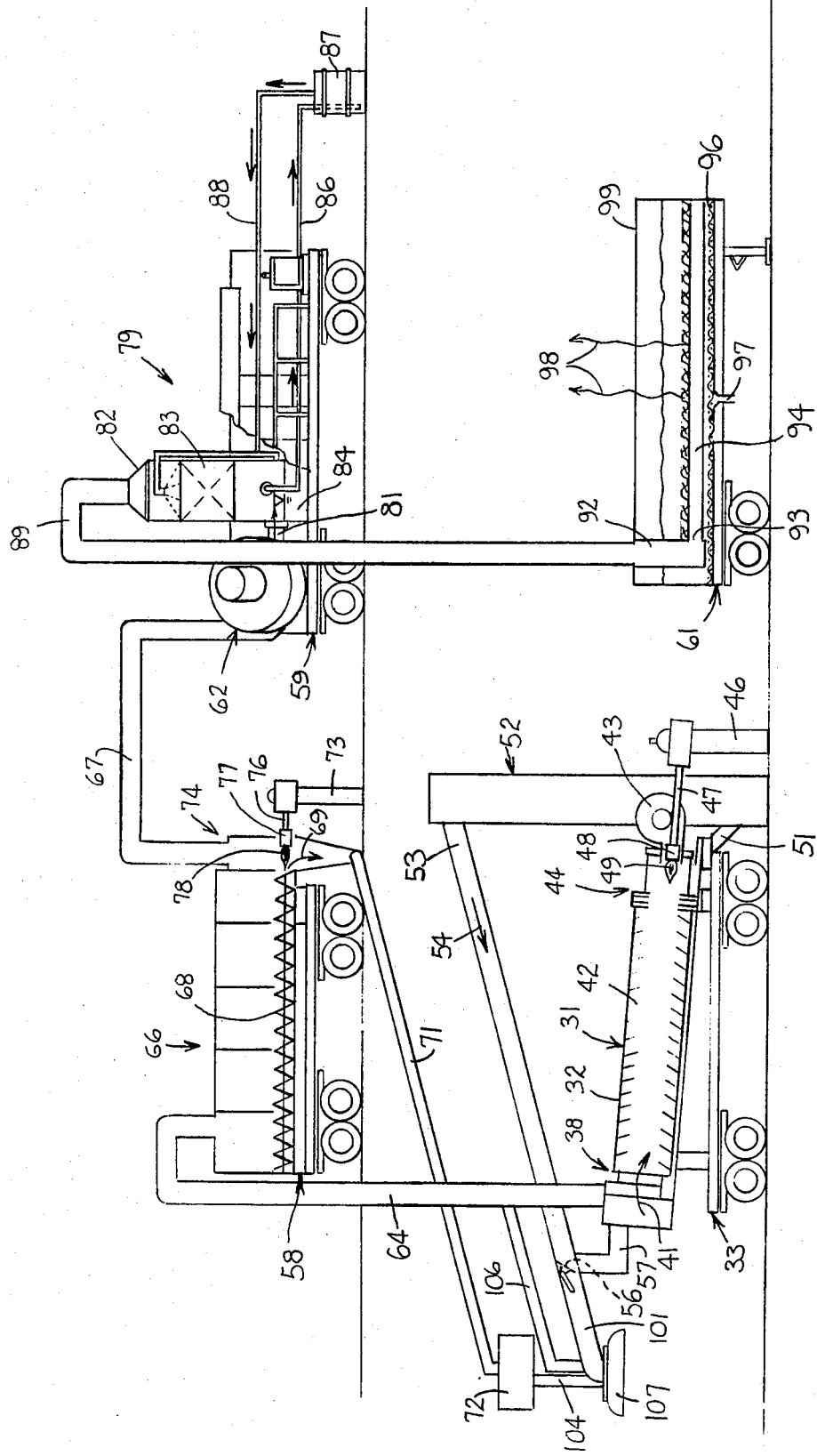
FIG. 3 is a side elevational view of the inventive apparatus.

A materials dryer 31 is provided and includes a rotatably supported and elongated hollow cylinder 32. Rotating cylinders are known and, therefore, the specific drive arrangement for effecting a rotation of the cylinder 32 is not shown. Reference can be made and incorporated herein, however, to the structure supporting an elongate and hollow cylinder for rotation in U.S. Pat. No. 4,285,773. The cylinder 32 may be mounted on the bed of a semi-truck trailer 33 to allow easy movement of the materials dryer 31 to any convenient location on a given site as well as between respective sites. The materials dryer 31 is inclined upwardly from right to left (FIG. 3) with the inlet end being at the left end and the material outlet being at the right end. A covered material conveyor 36 is located near the discharge of the integrally mounted and covered material conveyor 34, which extends beneath the outlet openings of the respective hoppers 29A, 29B and 29C. Conveyor 34 discharges the soil placed in the hoppers onto the receiving end of conveyor 36. Conveyor 36 conveys the soil up to chute 39 at the inlet end 38 of the materials dryer 31. The materials conveyor 36 dumps into an inlet chute 39 which delivers contaminated soil to the interior of the materials dryer 31 at the inlet end 38 in the direction of the arrow 41 (FIG. 3). The inside of the materials dryer 31 has a plurality of material conveying flights 42 which serve to lift the contaminated soil as the cylinder 32 is rotated and cause it to fall from the top portion of the arc as the cylinder 32 is rotated. This tumbling action of the contaminated soil is an important facet of the materials dryer 31. A blower 43 is provided at the outlet end 44 of the materials dryer 31 and introduces fresh air into the outlet end 44 and at a rate that is approximately 3000 cfm, but may vary depending upon size of the cylinder 31 utilized. In addition, a fuel tank 46 is provided adjacent the outlet end 44. Fuel is delivered through an appropriate conduit 47 to a burner nozzle 48 whereat the fuel is atomized and ignited to produce a flame 49. The combined effect of the flame 49 and the fresh air from the blower 43 travels lengthwise of the materials dryer 31 toward the inlet end 38. This flame commonly effects a heating of the soil to a range of 250° F. to 400° F., as measured by the temperature of the exiting material at the outlet end. The burner, in the preferred embodiment, consumes approximately two gallons of No. 2 diesel fuel per dry ton of material processed. The heat produced in the materials dryer 31 effects a volatilizing of the VOCs from the soil. The volatilized organic compounds are collected in a gaseous form by structure that will be described in more detail below.

Treated soil exits the outlet end 44 of the materials dryer 31 through a chute 51 to a elevator 52 which lifts the treated soil vertically upwardly (as by plural buckets not shown) and delivers the treated soil to a further chute 53. The treated soil travels down the chute 53 in direction of the arrow 54 to a gate 56 which directs the soil through a still further chute 57 into the inlet end 38 of the materials dryer. Thus, the treated soil is recirculated multiple times through the materials dryer 31 to effect a nearly complete volatilization of al VOCs contained in the contaminated soil.

As stated above, contaminated soil, in discrete volumes generally totalling approximately three cubic yards, is processed at a single time. This means that the operation of the apparatus is completed on a batch basis, with the soil batch recirculated through the materials dryer 31 until satisfactory treatment is obtained.

In the preferred embodiment, the dryer 31 is approximately seven feet in diameter and 28 feet in length. The cylinder 32 normally rotates at a rate of six revolutions per minute and has approximately 15 flights inside the drum to promote the mixing of the soil and the exposure of the soil to the hot air forced into the drum by the burner unit. The cold, damp soil is fed into the elevated inlet end of the cylinder 32 and is dried as it slowly works its way to the low outlet end of the cylinder. Under normal operating conditions, the materials dryer 31 processes about two tons of soil per minute with operating temperatures as aforesaid. The materials dryer will provide the most efficient aeration of the soils. The rotation and mixing of the soils by the longitudinal flights will promote intimate contact of the soils with heated fresh air within an enclosed environment. The retention time of the soils within the dryer may be varied by adjusting the angle of inclination of the cylinder.

In addition to the materials dryer trailer 33, there is a baghouse trailer 58, an air scrubber trailer 59 and a carbon adsorption unit trailer 61. A blower unit 74 is mounted on, in this particular embodiment, the baghouse trailer 58. Fresh air is drawn into an inlet 63 (FIG. 2) adjacent the inlet end 38 of the materials dryer 31 as well as the air from the blower unit 43, and conduits or chutes 51, 57, 101 and 106 into a conduit 64, through a baghouse filter arrangement 66 on the baghouse trailer 58 by the blower 74. Thus, any dust that may likely be generated as material from hoppers 29A, 29B and 29C is delivered to the inlet end 38 of the materials dryer 31 or as material is recycled through chute 57 or as material is discharged through chute 101 will be prevented from exiting the opening 63 or escaping from around shroud 107 by the suction force generated by blower 74. In addition, the hot volatilized gases generated in the materials dryer 31 will exit the materials dryer 31 into the conduit 64 and enter the baghouse arrangement 66. Material fines will be removed from the volatilized gases by the filtering structure in the baghouse arrangement 66. Generally, the baghouse arrangement is of a conventional design and requires no further discussion other than to state that inflatable bags are present in the baghouse arrangement 66, which bags trap material fines and allow the volatilized gases to continue their passage to the blower 74. Periodically, the bags in the baghouse arrangement are pulsed by compressed air and the material fines collected on the bags are dislodged and permitted to drop therefrom into a trough in which an auger 68 is provide. The auger removes the material fines from the baghouse arrangement 66, in the direction of arrow 69, and introduces them into an auger 71 and thence to a slurry box 72 whereat the material fines are mixed into a slurry form.

A fuel tank 73 is provided adjacent the blower 74 of the baghouse arrangement 66. Fuel is supplied through a conduit 76 to a nozzle 77 whereat the fuel is atomized and ignited to produce a flame 78. The flame acts directly on the material fines as they exit the baghouse arrangement 66 to volatilize any volatile organic compounds (VOCs) that may yet remain on the material fines prior to their introduction into the auger 71 for delivery to the slurry box 72.

The fresh air introduced into the opening 63 will effectively cool the hot gases exiting from the materials dryer 31 and to a sufficient extent such as to not damage the material of the bags in the baghouse arrangement 66. The blower 74 will operate in the range of 10,000 to 15,000 cfm so that the total air flow through the baghouse arrangement 66 will be approximately 15,000 cfm.

An air scrubber unit 79 is mounted on the air scrubber trailer 59. A blower unit 62 is mounted on, in the preferred embodiment, the air scrubber trailer 59, and draws air through conduit 67 from blower 74. The air scrubber unit 79 is of a conventional design and, therefore, further detailed comment concerning its structure is believed unnecessary. Nevertheless, it should be sufficient to state that the outlet conduit 81 from the blower unit 62 enters the bottom end of an air scrubber tower 82 and moves upwardly through a packing 83 therein while liquid passes downwardly through the packing and collected in a reservoir 84 at the bottom portion of the tower 82. The volatilized gases passing up through the packing 83 will have removed therefrom any organics, acids or phosgenes that may have collected in the volatilized gases following a passage of the contaminated material through the materials dryer 31. Periodically, the liquid collected in the reservoir 84 is delivered through a conduit 86 to a carbon adsorption unit 87 whereat the liquid is circulated therethrough for the purpose of removing organics. The liquid then returns via the conduit 88 to the top of the packed tower 82 for purposes of recirculating the now cleansed liquid back through the packing 83 for purposes of collecting further organics, acids and phosgenes.

The air blown up through the packed tower 82 exits the tower via a conduit 89 and is delivered to a carbon adsorption unit 90 on a carbon adsorption unit trailer 61 whereat there is provided a bed of activated carbon. A plenum or manifold structure 92 with each conduit 94 covered with a mesh of fabric to prevent entry of the activated carbon to the interior of the conduit 94 is provided adjacent one end of the trailer 61 and the conduit 89 introduces the volatilized gases into the plenum 92. Plural outlet openings 93 are provided adjacent the bottom of the plenum, to each of which is connected an elongated and perforated hose or conduit 94. In the preferred embodiment, there are a total of four conduits 94 extending lengthwise of the trailer and from the bottom of the plenum 92. The conduits 94 are mounted on a mesh 96 so as to elevate the conduits 94 from the bed of the trailer 61. Any moisture collecting within the carbon adsorption unit trailer 61 will be permitted to drop onto the mesh 96 and eventually make its way to an exhaust opening 97 to facilitate a removal of the collected moisture from within the trailer 61. The volatilized gases will pass through the activated carbon bed 91 in direction of the arrows 98 for the purpose of removing the volatile organics from the gas allowing, therefore, only clean air to enter the atmosphere. A canvaslike top 99 may be placed over the top of the bed of activated carbon to prevent water from collecting on the carbon bed from snow, rain or the like.

As indicated by the foregoing discussion, it should be apparent that none of the volatilized gases are permitted to escape into the atmosphere. All of the volatilized gases are drawn into the baghouse arrangement 66 and thence the air scrubber unit 79 and thence the carbon adsorption unit 90 for purposes of removing organics and the like therefrom. Thus, only clean air is permitted to enter the atmosphere as schematically represented by the arrows 98 in FIG. 3.

Following the processing of a batch of soil in the materials dryer 31, the gate 56 effects a closing of the inlet to the chute 57 and an opening of the conduit 53 to allow an emptying of the materials dryer 31 through a chute section 101 into the cement mixer drum 102 of a cement mixer vehicle 103. Simultaneously, the slurry box 72 is emptied through a conduit 104 into the cement mixer drum 102. Any dust generated by this dumping process into the cement mixer drum 102 is drawn through a conduit 106 into the conduit 64. A shroud 107 is provided to cover the opening 108 into the cement mixer drum 102. The cement mixer vehicle rotates the cement mixing drum 102 to effect a thorough mixing of the dry and treated soil exiting the materials dryer 31 with the slurry emptied from the slurry box 72. In addition, a supply of cement is introduced into the cement mixing drum 102 along with any additional water that may be needed so that the aggregate can be thoroughly mixed as the vehicle moves toward the casings 24. Once the vehicle arrives at the casings 24, and following a thorough mixing of the aggregate within the cement mixing drum 102, the contents of the cement mixing drum 102 is emptied into an appropriate one of the casings 24 from which contaminated soil has been removed. Thereafter, the aggregate in the casing 24 is permitted to harden and become a stable item in the soil. Following the discharge of the aggregate, the casing 24 is removed from the ground leaving the aggregate, in a columnar form, which stabilizes into a self-supporting mass of now clean soil and cement. The casing so removed from the ground can be reused by replacing into the ground between two adjacent casings since, as stated above, sufficient space has been provided between the casings to allow this to take place. A careful spacing of the initial casings placed into the ground will enable further casings to be placed therebetween so that virtually all of the contaminated soil from a region within the ground can be excavated and treated by the above discussed apparatus.

If heavy metals and the like are not present in the cleaned soil, a mixing of the soil with cement is deemed not necessary. The cleaned soil can be conveyed direct to a selected location and returned to the ground.

Atmospheric air around the work site is continuously monitored by conventional air monitoring equipment, not shown. If at any time during the operation of the aforementioned apparatus there should be a detection of emissions in excess of a predefined limit, an alarm will be sounded and the operation will be brought to a halt until the presence of the emissions is dissipated.

Figure 1B:
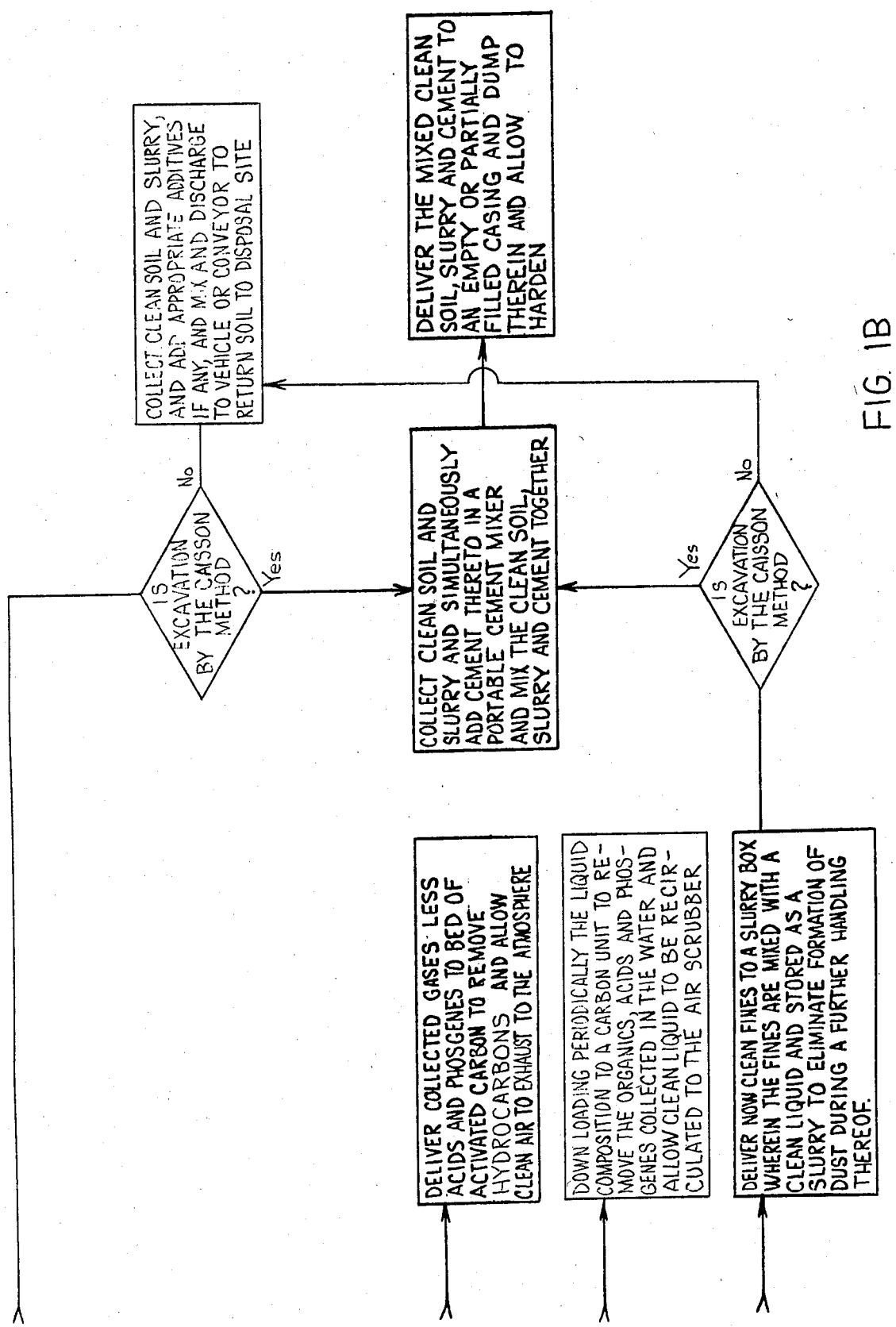

As is shown in FIGS. 1A and 1B, the methodology employed by the above-discussed apparatus is shown therein. Each of the method steps has been described above and, therefore, further discussion thereof is believed unnecessary.

EXAMPLE

Tests of the method have been performed at the McKin Superfund Site at Gray, Me. In a first series of tests, soil samples were taken from various locations within test zones at the McKin Site, which zones had been previously identified as being contaminated with organic soil contaminants. The soil test samples from the different locations contained different concentrations of the contaminants. The soil test samples were each treated by the method according to the invention, wherein the soil test samples were passed through the materials dryer three times. No appreciable change in the data occurred when a soil sample was passed through the materials dryer for a fourth time. U.S. EPA methods 8020 and 8010 were used to measure the concentrations of various volatile organic compounds in soil samples, before and after the soil samples were treated by the method according to the invention. The test results are set forth in the following Table I.

TABLE I
COMPARISON OF PRETREATMENT AND POST-TREATMENT SOIL CHARACTERIZATION
LOW TEMPERATURE THERMAL AERATION PROCESS MCKIN SUPERFUND SITE GRAY, MAINE

| SAMPLE I.D. Type | 31368.9 Pretreatment | 31368.9 Post-treatment | 31683.9 Pretreatment | 31683.9 Post-treatment | 32083.5 Pretreatment | 32083.5 Post-treatment |
|---|---|---|---|---|---|---|
| U.S. EPA Method 8020 | Location 1 | | Location 2 | | Location 3 | |
| Benzene | ND 10. | ND 1. | ND 10. | ND 1. | ND 5. | ND 1. |
| Chlorobenzene | ND 1 | | ND 0.02 | | ND 0.1 | |
| 1,2-Dichlorobenzene | ND 1 | ND 0.02 | 16 | ND 0.02 | 300 | ND 0.02 |

TABLE I-continued
COMPARISON OF PRETREATMENT AND POST-TREATMENT SOIL CHARACTERIZATION LOW TEMPERATURE THERMAL AERATION PROCESS MCKIN SUPERFUND SITE GRAY, MAINE

| | | | | | | |
|---|---|---|---|---|---|---|
| 1,3-Dichlorobenzene | ND 1 | ND 0.02 | ND 0.02 | ND 0.02 | ND 0.1 | ND 0.02 |
| 1,4-Dichlorobenzene | ND 1 | ND 0.02 | ND 0.02 | ND 0.02 | ND 0.1 | ND 0.02 |
| Ethylbenzene | 28 | ND 1. | 20 | ND 1. | 130 | ND 1. |
| Toluene | 35 | ND 1. | ND 10. | ND 1. | ND 5. | ND 1. |
| Xylenes | 84 | ND 1. | 38 | ND 1. | 840 | ND 1. |
| U.S. EPA Method 8010 | | | | | | |
| Bromodichloromethane | ND 0.02 | | ND 0.02 | | ND 0.1 | |
| Bromoform | ND 0.02 | | ND 0.02 | | ND 0.1 | |
| Bromomethane | ND 0.02 | | ND 0.02 | | ND 0.1 | |
| Carbon Tetrachloride | ND 0.02 | | ND 0.02 | | ND 0.1 | |
| Chlorobenzene | ND 0.02 | | ND 0.02 | | ND 0.1 | |
| Chloroethane | ND 0.02 | | ND 0.02 | | ND 0.1 | |
| 2-Chloroethylvinyl ether | ND 0.02 | | ND 0.02 | | ND 0.1 | |
| Chloroform | ND 0.02 | | ND 0.02 | | ND 2 | |
| Chloromethane | ND 0.02 | | ND 0.02 | | ND 0.1 | |
| Dibromochloromethane | ND 0.02 | | ND 0.02 | | ND 0.1 | |
| 1,2-Dichlorobenzene | ND 0.02 | ND 0.02 | 16 | ND 0.02 | 300 | ND 0.02 |
| 1,3-Dichlorobenzene | ND 0.02 | ND 0.02 | ND 0.02 | ND 0.02 | ND 0.1 | ND 0.02 |
| 1,4-Dichlorobenzene | ND 0.02 | ND 0.02 | ND 0.02 | ND 0.02 | ND 0.1 | ND 0.02 |
| Dichlorodifluoromethane | ND 0.02 | | ND 0.02 | | ND 0.1 | |
| 1,1-Dichloroethane | ND 0.02 | | ND 0.02 | | ND 0.1 | |
| 1,2-Dichloroethane | ND 0.02 | | ND 0.02 | | ND 0.1 | |
| 1,1-Dichloroethene | ND 0.02 | | ND 0.02 | | ND 0.1 | |
| trans-1,1-Dichloroethene | 0.11 | ND 0.02 | ND 0.02 | ND 0.02 | ND 2 | ND 0.02 |
| 1,2-Dichloropropane | ND 0.02 | | ND 0.02 | | ND 0.1 | |
| cis-1,3-Dichloropropene | ND 0.02 | | ND 0.02 | | ND 0.1 | |
| trans-1,3-Dichloropropene | ND 0.02 | | ND 0.02 | | ND 0.1 | |
| 1,1,2,2-Tetrachloroethane | ND 0.02 | | 9 | | ND 0.1 | |
| Tetrachloroethane | 0.09 | ND 0.02 | ND 0.02 | ND 0.02 | 40 | ND 0.02 |
| 1,1,1-Trichloroethane | 0.13 | ND 0.02 | 0.04 | ND 0.02 | 1.1 | ND 0.02 |
| 1,1,2-Trichloroethane | ND 0.02 | | ND 0.02 | | ND 0.1 | |
| Trichloroethene | 7.3 | ND 0.02 | 20 | ND 0.02 | 650 | 0.04 |
| Trichlorofluoromethane | ND 0.02 | | ND 0.02 | | ND 0.1 | |
| Vinyl chloride | ND 0.02 | | ND 0.02 | | ND 0.1 | |
| Methylene chloride | ND 0.02 | | ND 0.02 | | ND 0.1 | |

| SAMPLE I.D. | 32077.5 | 32077.5 | 32073.5 | 32073.5 | 32068.5 | 32068.5 |
|---|---|---|---|---|---|---|
| Type | Pretreatment | Post-treatment | Pretreatment | Post-treatment | Pretreatment | Post-treatment |
| | Location 4 | | Location 5 | | Location 6 | |
| U.S. EPA Method 8020 | | | | | | |
| Benzene | ND 10. | ND 1. | ND 10. | ND 1. | ND 1. | ND 1. |
| Chlorobenzene | ND 0.2 | | ND 0.2 | | ND 0.02 | |
| 1,2-Dichlorobenzene | 15 | ND 0.02 | 43 | ND 0.02 | 320 | ND 0.02 |
| 1,3-Dichlorobenzene | ND 0.2 | ND 0.02 | ND 0.2 | ND 0.02 | ND 0.02 | ND 0.02 |
| 1,4-Dichlorobenzene | ND 0.2 | ND 0.02 | ND 0.2 | ND 0.02 | ND 0.02 | ND 0.02 |
| Ethylbenzene | ND 10. | ND 1. | 19 | ND 1. | 72 | ND 1. |
| Toluene | ND 10. | ND 1. | ND 10. | ND 1. | ND 1. | ND 1. |
| Xylenes | ND 10. | ND 1. | 44 | ND 1. | 160 | ND 1. |
| U.S. EPA Method 8010 | | | | | | |
| Bromodichloromethane | ND 0.2 | | ND 0.2 | | ND 1 | |
| Bromoform | ND 0.2 | | ND 0.2 | | ND 1 | |
| Bromomethane | ND 0.2 | | ND 0.2 | | ND 1 | |
| Carbon Tetrachloride | ND 0.2 | | ND 0.2 | | ND 1 | |
| Chlorobenzene | ND 0.2 | | ND 0.2 | | ND 1 | |
| Chloroethane | ND 0.2 | | ND 0.2 | | ND 1 | |
| 2-Chloroethylvinyl ether | ND 0.2 | | ND 0.2 | | ND 1 | |
| Chloroform | ND 0.2 | | ND 0.2 | | ND 1 | |
| Chloromethane | ND 0.2 | | ND 0.2 | | ND 1 | |
| Dibromochloromethane | ND 0.2 | | ND 0.2 | | ND 1 | |
| 1,2-Dichlorobenzene | 15 | ND 0.02 | 43 | ND 0.02 | 320 | ND 0.02 |
| 1,3-Dichlorobenzene | ND 0.2 | ND 0.02 | ND 0.2 | ND 0.02 | ND 1 | ND 0.02 |
| 1,4-Dichlorobenzene | ND 0.2 | ND 0.02 | ND 0.2 | ND 0.02 | ND 1 | ND 0.02 |
| Dichlorodifluoromethane | ND 0.2 | | ND 0.2 | | ND 1 | |
| 1,1-Dichloroethane | ND 0.2 | | ND 0.2 | | ND 1 | |
| 1,2-Dichloroethane | ND 0.2 | | ND 0.2 | | ND 1 | |
| 1,1-Dichloroethene | ND 0.2 | | ND 0.2 | | ND 1 | |
| trans-1,1-Dichloroethene | ND 0.2 | ND 0.02 | ND 0.2 | ND 0.02 | 6.1 | ND 0.02 |
| 1,2-Dichloropropane | ND 0.2 | | ND 0.2 | | ND 1 | |
| cis-1,3-Dichloropropene | ND 0.2 | | ND 0.2 | | ND 1 | |
| trans-1,3-Dichloropropene | ND 0.2 | | ND 0.2 | | ND 1 | |
| 1,1,2,2-Tetrachloroethane | 0.35 | | ND 0.2 | | ND 1 | |
| Tetrachloroethane | ND 0.2 | ND 0.02 | 8.8 | ND 0.02 | 120 | ND 0.02 |
| 1,1,1-Trichloroethane | ND 0.2 | ND 0.02 | 0.4 | ND 0.02 | 19 | ND 0.02 |
| 1,1,2-Trichloroethane | ND 0.2 | | ND 0.2 | | ND 1 | |
| Trichloroethene | 0.54 | 0.04 | 210 | 0.04 | 3310 | .04 |
| Trichlorofluoromethane | ND 0.2 | | ND 0.2 | | ND 1 | |
| Vinyl chloride | ND 0.2 | | ND 0.2 | | ND 1 | |
| Methylene chloride | 0.53 | | ND 0.2 | | ND 3.8 | |

| SAMPLE I.D. | 32365.3 | 32365.3 | 32483.5 | 32483.5 | 32683.5 | 32683.5 |
|---|---|---|---|---|---|---|
| Type | Pretreatment | Post-treatment | Pretreatment | Post-treatment | Pretreatment | Post-treatment |

TABLE I-continued
COMPARISON OF PRETREATMENT AND POST-TREATMENT SOIL CHARACTERIZATION
LOW TEMPERATURE THERMAL AERATION PROCESS MCKIN SUPERFUND SITE GRAY, MAINE

| U.S. EPA Method 8020 | Location 7 | | Location 8 | | Location 9 | |
|---|---|---|---|---|---|---|
| Benzene | 2.7 | ND 1. | ND 100 | ND 1. | ND 50 | ND 1. |
| Chlorobenzene | ND 0.02 | | ND 2 | | ND 1 | |
| 1,2-Dichlorobenzene | 33 | ND 0.02 | 31 | ND 0.02 | ND 1 | ND 0.02 |
| 1,3-Dichlorobenzene | ND 0.02 | ND 0.02 | ND 2 | ND 0.02 | ND 1 | ND 0.02 |
| 1,4-Dichlorobenzene | ND 0.02 | ND 0.02 | ND 2 | ND 0.02 | ND 1 | ND 0.02 |
| Ethylbenzene | 1.8 | ND 1. | 130 | ND 1. | ND 50 | ND 1. |
| Toluene | 4 | ND 1. | ND 1 | ND 1. | ND 50 | ND 1. |
| Xylenes | 12.9 | ND 1. | 140 | ND 1. | ND 50 | ND 1. |
| U.S. EPA Method 8010 | | | | | | |
| Bromodichloromethane | ND 4 | | ND 2 | | ND 2 | |
| Bromoform | ND 4 | | ND 2 | | ND 2 | |
| Bromomethane | ND 4 | | ND 2 | | ND 2 | |
| Carbon Tetrachloride | ND 4 | | ND 2 | | ND 2 | |
| Chlorobenzene | ND 4 | | ND 2 | | ND 2 | |
| Chloroethane | ND 4 | | ND 2 | | ND 2 | |
| 2-Chloroethylvinyl ether | ND 4 | | ND 2 | | ND 2 | |
| Chloroform | ND 4 | | ND 2 | | 7.3 | |
| Chloromethane | ND 4 | | ND 2 | | ND 2 | |
| Dibromochloromethane | ND 4 | | ND 2 | | ND 2 | |
| 1,2-Dichlorobenzene | 33 | ND 0.02 | 30 | ND 0.02 | 15 | ND 0.02 |
| 1,3-Dichlorobenzene | ND 4 | ND 0.02 | ND 2 | ND 0.02 | ND 2 | ND 0.02 |
| 1,4-Dichlorobenzene | ND 4 | ND 0.02 | ND 2 | ND 0.02 | ND 2 | ND 0.02 |
| Dichlorodifluoromethane | ND 4 | | ND 2 | | ND 2 | |
| 1,1-Dichloroethane | ND 4 | | ND 2 | | ND 2 | |
| 1,2-Dichloroethane | ND 4 | | ND 2 | | ND 2 | |
| 1,1-Dichloroethene | ND 4 | | ND 2 | | ND 2 | |
| trans-1,1-Dichloroethene | ND 4 | ND 0.02 | ND 2 | ND 0.02 | ND 2 | ND 0.02 |
| 1,2-Dichloropropane | ND 4 | | ND 2 | | ND 2 | |
| cis-1,3-Dichloropropene | ND 4 | | ND 2 | | ND 2 | |
| trans-1,3-Dichloropropene | ND 4 | | ND 2 | | ND 2 | |
| 1,1,2,2-Tetrachloroethane | ND 4 | | ND 2 | | 8.3 | |
| Tetrachloroethane | 4.3 | ND 0.02 | 19 | ND 0.02 | ND 2 | ND 0.02 |
| 1,1,1,Trichloroethane | 8.6 | ND 0.02 | ND 2 | ND 0.02 | ND 2 | ND 0.02 |
| 1,1,2-Trichloroethane | ND 4 | | ND 2 | | ND 2 | |
| Trichloroethene | 1000 | ND 0.02 | 140 | ND 0.02 | 150 | ND 0.02 |
| Trichlorofluoromethane | ND 4 | | ND 2 | | ND 2 | |
| Vinyl chloride | ND 4 | | ND 2 | | ND 2 | |
| Methylene chloride | ND 4 | | 12 | | 9.7 | |

| SAMPLE I.D. | 32678.5 | 32678.5 | 32673.5 | 32673.5 | 32668.5 | 32668.5 |
|---|---|---|---|---|---|---|
| Type | Pretreatment | Post-treatment | Pretreatment | Post-treatment | Pretreatment | Post-treatment |
| U.S. EPA Method 8020 | Location 10 | | Location 11 | | Location 12 | |
| Benzene | ND 1. | ND 1. | ND 50 | ND 1. | ND 50 | ND |
| Chlorobenzene | ND 0.02 | | ND 1 | | ND 1 | |
| 1,2-Dichlorobenzene | 7.6 | ND 0.02 | 22 | ND 0.02 | ND 1 | ND 0.02 |
| 1,3-Dichlorobenzene | ND 0.02 | ND 0.02 | ND 1 | ND 0.02 | ND 1 | ND 0.02 |
| 1,4-Dichlorobenzene | ND 0.02 | ND 0.02 | ND 1 | ND 0.02 | ND 1 | ND 0.02 |
| Ethylbenzene | 20 | ND 1. | ND 50 | ND 1. | ND 50 | ND 1. |
| Toluene | 1 | ND 1. | ND 50 | ND 1. | ND 50 | ND 1. |
| Xylenes | 34 | ND 1. | 62 | ND 1. | ND 50 | ND 1. |
| U.S. EPA Method 8010 | | | | | | |
| Bromodichloromethane | ND 0.02 | | ND 1 | | ND 2 | |
| Bromoform | ND 0.02 | | ND 1 | | ND 2 | |
| Bromomethane | ND 0.02 | | ND 1 | | ND 2 | |
| Carbon Tetrachloride | ND 0.02 | | ND 1 | | ND 2 | |
| Chlorobenzene | ND 0.02 | | ND 1 | | ND 2 | |
| Chloroethane | ND 0.02 | | ND 1 | | ND 2 | |
| 2-Chloroethylvinyl ether | ND 0.02 | | ND 1 | | ND 2 | |
| Chloroform | 0.43 | | ND 1 | | 30 | |
| Chloromethane | ND 0.02 | | ND 1 | | ND 2 | |
| Dibromochloromethane | ND 0.02 | | ND 1 | | ND 2 | |
| 1,2-Dichlorobenzene | 7.6 | ND 0.02 | 22 | ND 0.02 | 15 | ND 0.02 |
| 1,3-Dichlorobenzene | ND 0.02 | ND 0.02 | ND 1 | ND 0.02 | ND 2 | ND 0.02 |
| 1,4-Dichlorobenzene | ND 0.02 | ND 0.02 | ND 1 | ND 0.02 | ND 2 | ND 0.02 |
| Dichlorodifluoromethane | ND 0.02 | | ND 1 | | ND 2 | |
| 1,1-Dichloroethane | ND 0.02 | | ND 1 | | ND 2 | |
| 1,2-Dichloroethane | ND 0.02 | | ND 1 | | ND 2 | |
| 1,1-Dichloroethene | ND 0.02 | | ND 1 | | ND 2 | |
| trans-1,1-Dichloroethene | ND 0.02 | ND 0.02 | ND 1 | ND 0.02 | ND 2 | ND 0.02 |
| 1,2-Dichloropropane | ND 0.02 | | ND 1 | | ND 2 | |
| cis-1,3-Dichloropropene | ND 0.02 | | ND 1 | | ND 2 | |
| trans-1,3-Dichloropropene | ND 0.02 | | ND 1 | | ND 2 | |
| 1,1,2,2-Tetrachloroethane | ND 0.02 | | ND 1 | | ND 2 | |
| Tetrachloroethane | 3.6 | ND 0.02 | 2.7 | ND 0.02 | 6 | ND 0.02 |
| 1,1,1-Trichloroethane | ND 0.02 | ND 0.02 | 0.14 | ND 0.02 | 2.9 | ND 0.02 |
| 1,1,2-Trichloroethane | ND 0.02 | | ND 1 | | ND 2 | |
| Trichloroethene | 7.9 | ND 0.02 | 34 | ND 0.02 | 314 | ND 0.02 |
| Trichlorofluoromethane | ND 0.02 | | ND 1 | | ND 2 | |
| Vinyl chloride | ND 0.02 | | ND 1 | | ND 2 | |

TABLE I-continued
COMPARISON OF PRETREATMENT AND POST-TREATMENT SOIL CHARACTERIZATION LOW TEMPERATURE THERMAL AERATION PROCESS MCKIN SUPERFUND SITE GRAY, MAINE

| | | | |
|---|---|---|---|
| Methylene chloride | 1 | ND 1 | 15 |

Note:
All values shown are in mg/kg.
ND x indicates that compound was not detected at a concentration in excess of x mg/kg. Where no value is reported for a particular compound, that compound was not analyzed in post-treatment soil samples.

In a second series of tests, soil samples were taken from various locations within test zones 323, 326 and 329 at the McKin Site, which zones had been previously identified as being contaminated with organic soil contaminants of a petroleum origin. The soil test samples from the different locations contained different concentrations of the contaminants. The soil test samples were each treated by the method according to the invention, wherein the soil test samples were passed through the materials dryer three times. No appreciable change in the data occurred when a soil sample was passed through the materials dryer for a fourth time performed at the McKin Superfund Site at Gray, Me. U.S. EPA method 8020 and 8270 were used to measure the concentrations of various volatile organic compounds in soil samples, before and after the soil samples were treated by the method according to the invention. The test results are set forth in the following Table II.

TABLE II
COMPARISON OF PRETREATMENT AND POST-TREATMENT SOIL CHARACTERIZATION PETROLEUM AREA SOILS REMEDIATION LOW TEMPERATURE THERMAL AERATION PROCESS MCKIN SUPERFUND SITE GRAY, MAINE

| SAMPLE I.D. Type | 323A Pretreatment | 323B Post-treatment | 329A Pretreatment | 329B Post-treatment | 326A Pretreatment | 326B Post-treatment |
|---|---|---|---|---|---|---|
| U.S. EPA Method 8020 | Location 13 | | Location 14 | | Location 15 | |
| Benzene | ND 0.2 | ND 0.2 | ND 0.2 | ND 0.2 | ND 0.2 | ND 0.2 |
| Chlorobenzene | ND 0.2 | ND 0.2 | ND 0.2 | ND 0.2 | ND 0.2 | ND 0.2 |
| 1,2-Dichlorobenzene | 1.5 | ND 0.2 | 1.7 | ND 0.2 | 1.5 | ND 0.2 |
| 1,3-Dichlorobenzene | ND 0.2 | ND 0.2 | ND 0.2 | ND 0.2 | ND 0.2 | ND 0.2 |
| 1,4-Dichlorobenzene | ND 0.2 | ND 0.2 | ND 0.2 | ND 0.2 | ND 0.2 | ND 0.2 |
| Ethylbenzene | 1.5 | ND 0.2 | 2 | ND 0.2 | 1.3 | ND 0.2 |
| Toluene | ND 0.2 | ND 0.2 | 0.3 | ND 0.2 | 0.2 | ND 0.2 |
| Xylenes | 3.7 | ND 0.2 | 4.9 | ND 0.2 | 3.3 | ND 0.2 |
| U.S. EPA Method 8270 | | | | | | |
| N—Nitrosodiethylamine | ND 0.330 | ND 0.330 | ND 0.330 | ND 0.330 | ND 0.330 | ND 0.330 |
| Phenol | ND 0.330 | ND 0.330 | ND 0.330 | ND 0.330 | ND 0.330 | ND 0.330 |
| bis (-2-Chloroethyl) Ether | ND 0.330 | ND 0.330 | ND 0.330 | ND 0.330 | ND 0.330 | ND 0.330 |
| 2-Chlorophenol | ND 0.330 | ND 0.330 | ND 0.330 | ND 0.330 | ND 0.330 | ND 0.330 |
| 1,3-Dichlorobenzene | ND 0.330 | ND 0.330 | ND 0.330 | ND 0.330 | ND 0.330 | ND 0.330 |
| 1,4-Dichlorobenzene | ND 0.330 | ND 0.330 | ND 0.330 | ND 0.330 | ND 0.330 | ND 0.330 |
| 1,2-Dichlorobenzene | 0.920 | ND 0.330 | 1.900 | ND 0.330 | 0.710 | ND 0.330 |
| bis (2-chloroisopropyl) Ether | ND 0.330 | ND 0.330 | ND 0.330 | ND 0.330 | ND 0.330 | ND 0.330 |
| N—Nitroso-Di-Propylamine | ND 0.330 | ND 0.330 | ND 0.330 | ND 0.330 | ND 0.330 | ND 0.330 |
| Hexachloroethane | ND 0.330 | ND 0.330 | ND 0.330 | ND 0.330 | ND 0.330 | ND 0.330 |
| Nitrobenzene | ND 0.330 | ND 0.330 | ND 0.330 | ND 0.330 | ND 0.330 | ND 0.330 |
| Isophorone | 0.740 | ND 0.330 | 0.790 | ND 0.330 | 0.450 | ND 0.330 |
| 2-Nitrophenol | ND 0.330 | ND 0.330 | ND 0.330 | ND 0.330 | ND 0.330 | ND 0.330 |
| 2,4-Dimethylphenol | ND 0.330 | ND 0.330 | ND 0.330 | ND 0.330 | ND 0.330 | ND 0.330 |
| bis (-2-Chloroethoxy) Methane | ND 0.330 | ND 0.330 | ND 0.330 | ND 0.330 | ND 0.330 | ND 0.330 |
| 2,4-Dichlorophenol | ND 0.330 | ND 0.330 | ND 0.330 | ND 0.330 | ND 0.330 | ND 0.330 |
| 1,2,4-Trichlorobenzene | ND 0.330 | ND 0.330 | ND 0.330 | ND 0.330 | ND 0.330 | ND 0.330 |
| Naphthalene | 0.800 | ND 0.330 | 0.750 | ND 0.330 | ND 0.330 | ND 0.330 |
| Hexachlorobutadiene | ND 0.330 | ND 0.330 | ND 0.330 | ND 0.330 | ND 0.330 | ND 0.330 |
| 4-Chloro-3-Methylphenol | ND 0.330 | ND 0.330 | ND 0.330 | ND 0.330 | ND 0.330 | ND 0.330 |
| Hexachlorocyclopentadiene | ND 0.330 | ND 0.330 | ND 0.330 | ND 0.330 | ND 0.330 | ND 0.330 |
| 2,4,6-Trichlorophenol | ND 0.330 | ND 0.330 | ND 0.330 | ND 0.330 | ND 0.330 | ND 0.330 |
| 2-Chloronaphthalene | ND 0.330 | ND 0.330 | ND 0.330 | ND 0.330 | ND 0.330 | ND 0.330 |
| Dimethyl Phthalate | ND 0.330 | ND 0.330 | ND 0.330 | ND 0.330 | ND 0.330 | ND 0.330 |
| Acenaphthylene | ND 0.330 | ND 0.330 | ND 0.330 | ND 0.330 | ND 0.330 | ND 0.330 |
| 2,6-Dinitrotoluene | ND 0.330 | ND 0.330 | ND 0.330 | ND 0.330 | ND 0.330 | ND 0.330 |
| SAMPLE I.D. Type | 323A Pretreatment | 323B Post-treatment | 329A Pretreatment | 329B Post-treatment | 326A Pretreatment | 326B Post-treatment |
| Acenaphthene | ND 0.330 | ND 0.330 | ND 0.330 | ND 0.330 | ND 0.330 | ND 0.330 |
| 2,6-Dinitrophenol | ND 0.330 | ND 1.650 | ND 0.330 | ND 1.650 | ND 0.330 | ND 1.650 |
| 4-Nitrophenol | ND 0.330 | ND 0.330 | ND 0.330 | ND 0.330 | ND 0.330 | ND 0.330 |
| 2,4-Dinitrotoluene | ND 0.330 | ND 0.330 | ND 0.330 | ND 0.330 | ND 0.330 | ND 0.330 |
| Diethylphthalate | ND 0.330 | ND 0.330 | ND 0.330 | ND 0.330 | ND 0.330 | ND 0.330 |
| 4-Chlorophenyl-phenylether | ND 0.330 | ND 0.330 | ND 0.330 | ND 0.330 | ND 0.330 | ND 0.330 |
| Fluorene | ND 0.330 | ND 0.330 | ND 0.330 | ND 0.330 | ND 0.330 | ND 0.330 |
| Benzidine | ND 0.330 | ND 0.330 | ND 0.330 | ND 0.330 | ND 0.330 | ND 0.330 |
| 4,6-Dinitro-2-Methylphenol | ND 0.330 | ND 1.650 | ND 0.330 | ND 1.650 | ND 0.330 | ND 1.650 |
| N—Nitrosodiphenylamine | ND 0.330 | ND 0.330 | ND 0.330 | ND 0.330 | ND 0.330 | ND 0.330 |
| 4-Bromophenyl-phenylether | ND 0.330 | ND 0.330 | ND 0.330 | ND 0.330 | ND 0.330 | ND 0.330 |
| Hexachlorobenzene | ND 0.330 | ND 0.330 | ND 0.330 | ND 0.330 | ND 0.330 | ND 0.330 |
| Pentachlorophenol | ND 0.330 | ND 1.650 | ND 0.330 | ND 1.650 | ND 0.330 | ND 1.650 |
| Phenanthrene | 0.850 | 0.630 | 1.200 | 0.510 | 1.100 | 0.540 |
| Anthracene | 0.790 | ND 0.330 | 1.200 | ND 0.330 | 0.810 | ND 0.330 |

TABLE II-continued
COMPARISON OF PRETREATMENT AND POST-TREATMENT SOIL CHARACTERIZATION
PETROLEUM AREA SOILS REMEDIATION LOW TEMPERATURE THERMAL AERATION PROCESS
MCKIN SUPERFUND SITE GRAY, MAINE

| | | | | | | |
|---|---|---|---|---|---|---|
| Di-N—Butylphthalate | ND 0.330 | ND 0.330 | ND 0.330 | ND 0.330 | ND 0.330 | ND 0.330 |
| Fluoranthene | 0.330 | ND 0.330 | 0.340 | ND 0.330 | 0.800 | ND 0.330 |
| Pyrene | ND 0.330 | ND 0.330 | ND 0.330 | ND 0.330 | ND 0.330 | ND 0.330 |
| Butylbenzylphthalate | ND 0.330 | ND 0.330 | ND 0.330 | ND 0.330 | 0.440 | ND 0.330 |
| 3,3'-Dichlorobenzidine | ND 0.660 | ND 0.660 | ND 0.660 | ND 0.660 | ND 0.660 | ND 0.660 |
| Benzo(a)Anthracene | ND 0.330 | ND 0.330 | ND 0.330 | ND 0.330 | ND 0.330 | ND 0.330 |
| bis-(2-Ethylhexyl) Phthalate | ND 0.330 | ND 0.330 | ND 0.330 | ND 0.330 | ND 0.330 | ND 0.330 |
| Chrysene | ND 0.330 | ND 0.330 | ND 0.330 | ND 0.330 | ND 0.330 | ND 0.330 |
| Di-N—Octyl Phthalate | ND 0.330 | ND 0.330 | ND 0.330 | ND 0.330 | ND 0.330 | ND 0.330 |
| Benzo(b)Fluoranthene | ND 0.330 | ND 0.330 | ND 0.330 | ND 0.330 | ND 0.330 | ND 0.330 |
| Benzo(k)Fluoranthene | ND 0.330 | ND 0.330 | ND 0.330 | ND 0.330 | ND 0.330 | ND 0.330 |
| Benzo(a)Pyrene | ND 0.330 | ND 0.330 | ND 0.330 | ND 0.330 | ND 0.330 | ND 0.330 |
| Indendo(1,2,3-cd)Pyrene | ND 0.330 | ND 0.330 | ND 0.330 | ND 0.330 | ND 0.330 | ND 0.330 |
| Dibenzo(a,h)Anthracene | ND 0.330 | ND 0.330 | ND 0.330 | ND 0.330 | ND 0.330 | ND 0.330 |
| Benzo(g,h,i)Perylene | ND 0.330 | ND 0.330 | ND 0.330 | ND 0.330 | ND 0.330 | ND 0.330 |
| Total Extractable Hydrocarbons | 1800 | 690 | 1600 | 700 | | |

Note:
All values shown are in mg/kg.
ND x indicates that compound was not detected at a concentration in excess of x mg/kg.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of on-site remedial soil restoration activity of a work site contaminated with volatile substances disposed at said site at an earlier time, which substances have soaked into said soil, the steps comprising:
removing contaminated soil from the ground and transporting it to an initial feed hopper means;
conveying said contaminated soil from said initial feed hopper means to an inlet end of a hollow rotating cylinder having plural flights therein for effecting a moving of said contaminated soil lengthwise of said rotating cylinder toward an outlet end of said cylinder in response to a rotating of said cylinder;
heating the contaminated soil as it tumbles about in said rotating cylinder and as the soil moves from said inlet end toward said outlet end, said volatile substances being volatilized inside said rotating cylinder;
evacuating the interior of said rotating cylinder by drawing hot gases containing the volatilized substances therefrom;
filtering the volatilized substances for purposes of collecting soil fines from which said substances have been volatilized;
conveying the soil exiting the outlet end of said rotating cylinder to a controllable gate whereat, when said controllable gate is in a first position all of said soil is fed to said inlet end and recirculated multiple times through said rotating cylinder;
opening said controllable gate to a second position to prevent the recirculating of said soil to said rotating cylinder and feeding all of the now cleaned soil to a conveying means, whereat said cleaned soil is delivered to a selected location;
placing said cleaned soil into the ground;
scrubbing the volatilized gases, by using air and a liquid, and collecting any organics, acids and phosgenes that might be present therein in a liquified form; and
feeding the volatilized gases with the organics, acids and phosgenes removed therefrom to a bed of activated carbon for the purpose of extracting the remaining volatilized substances therefrom and allowing the now clean air to escape into the atmosphere.

2. The method according to claim 1, wherein soil is treated in batches of a predefined quantity; and
wherein a said batch of soil is recirculated multiple times through said rotating cylinder before it is permitted to exit through said controllable gate in said second position.

3. The method according to claim 1, wherein the step of heating the contaminated soil includes the step of injecting an ignited fuel at a first cfm rate into the interior of said rotating cylinder from the outlet end; and
wherein the evacuating of the interior of said rotating cylinder includes the step of drawing the hot gases off at a second cfm rate that exceeds said first cfm rate of ignited fuel entering said rotating cylinder for purposes of cooling said hot gases.

4. The method according to claim 1, including the step of periodically feeding the collected liquified collection of any organics, acids and phosgenes to a carbon adsorption unit for the purpose of extracting said organics, acids and phosgenes from the liquid and recirculating the liquid to facilitate a scrubbing of further organics, acids and phosgenes from the gases removed from said interior of said rotating cylinder.

5. The method according to claim 1, including the step of heating the collected soil fines to volatilize any volatile substances yet remaining thereon and collecting the volatilized gases for subsequent delivery to the liquid and air scrubber and bed of activated carbon.

6. The method according to claim 1, including the step of placing a cylindrical casing into the ground and removing said contaminated soil from the interior of the casing;
wherein the step of placing the cleaned soil into the ground includes the step of placing it into a casing that has previously been emptied of contaminated soil.

7. The method according to claim 6, wherein the step of opening aid controllable gate includes the step of feeding all of said cleaned soil to a cement mixer vehicle, constituting said conveying means, whereat said cleaned soil is mixed with cement and liquid and delivered to said selected location.

8. The method according to claim 6, wherein said cylindrical casings are initially spaced a distance from each other generally equal to the diameter of a said casing so that after a stabilized composition has been formed in the casing, a further casing is inserted into the ground between the location of two initially adjacent casings and contaminated soil removed therefrom.

9. The method according to claim 8, wherein said casing are removed from the ground leaving the stabilized composition in place in the ground.

10. The method according to claim 1, wherein the step of opening said controllable gate includes the step of feeding all of said cleaned soil to a cement mixer vehicle, constituting said conveying means, whereat said cleaned soil is mixed with cement and liquid and delivered to said selected location.

11. An apparatus for on-site remedial soil restoration activity of a work site contaminated with volatile substances disposed at said site at an earlier time, which substances have soaked into said soil, comprising:
   means for removing contaminated soil from the ground and transporting it to an initial feed hopper means;
   means for conveying contaminated soil from said initial feed hopper means to an inlet end of a hollow rotating cylinder having plural flight means therein for effecting a moving of said contaminated soil lengthwise of said rotating cylinder toward an outlet end of said cylinder in response to a rotating of said cylinder;
   material drying means for heating the contaminated soil as it tumbles about in said rotating cylinder and as the soil moves from said inlet end toward said outlet end, said volatile substances being volatilized inside said rotating cylinder;
   means for evacuating the interior of said rotating cylinder by drawing hot gases containing the volatilized substances therefrom;
   means for filtering the volatilized substances for purposes of collecting soil fines from which said substances have been volatilized;
   means for conveying the soil exiting the outlet end of said rotating cylinder to a controllable gate whereat, when said controllable gate is in a first position, all of said soil is fed to said inlet end and recirculated multiple times through said rotating cylinders, an opening of said controllable gate to a second position preventing a recirculating of said soil to said rotating cylinder and feeding all of the now cleaned soil to a conveying means, whereat said cleaned soil is delivered to a selected location;
   means for placing said cleaned soil into the ground;
   means for scrubbing the volatilized gases, by using air and a liquid, any organics, acids and phosgenes that might be present therein, said organics, acids and phosgenes being collected in a liquid form; and
   means for feeding the volatilized gases with the organics, acids and phosgenes removed therefrom to a bed of activated carbon for the purpose of extracting the remaining volatilized substances therefrom and allowing the now clean air to escape into the atmosphere.

12. The apparatus according to claim 11, wherein said initial feed hopper means includes plural hoppers into which can be dumped contaminated soil of a predefined quantity, said plural hoppers enabling a collection of contaminated soil in those hoppers from which contaminated soil is presently not being removed so as to facilitate a treatment of a batch of contaminated soil by multiple passes through said rotating cylinder.

13. The apparatus according to claim 12, wherein said batch treated by said material dryer means is approximately three cubic yards.

14. The apparatus according to claim 11, wherein said material drying means includes a fuel tank means and a nozzle and fuel delivery means for facilitating a delivery of fuel to the fuel nozzle means whereat said fuel is ignited to produce a flame; and
   wherein said material drying means also includes a blower for introducing atmospheric air into the said rotating cylinder so that the combination of air and heat will effectively dry the soil being tumbled about within said rotating cylinder.

15. The apparatus according to claim 14, wherein said evacuating means draws atmospheric air into the inlet end of the material drying means as well as hot volatilized gases from within the rotating cylinder at a cfm rate that exceeds the cfm rate of the blower introducing atmospheric air into the interior of said rotating cylinder.

16. The apparatus according to claim 11, wherein said filtering means includes a further heating means for heating the collected soil fines collected by said filtering means to volatilize any volatile substances yet remaining thereon and collecting the volatilized gases by said evacuating means for subsequent delivery to said scrubbing means and said bed of activated carbon.

17. The apparatus according to claim 11, wherein said material drying means, said filtering means, said scrubbing means and said bed of activated carbon are all individually mounted on the bed of trailers to facilitate transportation thereof about the site as well as to other sites.

18. The apparatus according to claim 11, wherein said conveying means includes means for mixing cement and liquid with said cleaned soil.

* * * * *

UNITED STATES PATENT AND TRADEMARK OFFICE
CERTIFICATE OF CORRECTION

PATENT NO. : 4 782 625

DATED : November 8, 1988

INVENTOR(S) : Steven L. GERKEN et al.

It is certified that error appears in the above-identified patent and that said Letters Patent is hereby corrected as shown below:

Column 16, line 67; change "aid" to ---said---.

Column 17, line 12; change "casing" to ---casings---.

Signed and Sealed this

Eighth Day of August, 1989

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO.  : 4 782 625
DATED       : November 8, 1988
INVENTOR(S) : Steven L. Gerken et al.

It is certified that error appears in the above-identified patent and that said Letters Patent is hereby corrected as shown below:

On the title page, item [73], the name of the Assignee should read as follows: Canonie Environmental Services Corp.

Signed and Sealed this

Twelfth Day of December, 1989

Attest:

JEFFREY M. SAMUELS

*Attesting Officer*   *Acting Commissioner of Patents and Trademarks*